United States Patent [19]

Beard

[11] 4,337,317
[45] Jun. 29, 1982

[54] COMPOSITIONS AND METHODS FOR PRODUCING CLAYWARE

[75] Inventor: Ian A. Beard, Surbiton, England

[73] Assignee: United States Borax & Chemical Corp., Los Angeles, Calif.

[21] Appl. No.: 257,835

[22] Filed: Apr. 27, 1981

[30] Foreign Application Priority Data

Jan. 24, 1980 [GB] United Kingdom ................ 8002361
Jan. 23, 1981 [EP] European Pat Off. ......... 81300325.8

[51] Int. Cl.$^3$ .................... C04B 33/13; C04B 33/24
[52] U.S. Cl. .................................. 501/142; 501/141; 501/144; 156/313
[58] Field of Search ..................... 501/141, 142, 144; 106/313

[56] References Cited

U.S. PATENT DOCUMENTS 3,303,036  2/1967  Coffin ................................ 501/147
3,532,522  10/1970  Richards ........................... 501/144
3,704,146  11/1972  Dulat ................................ 106/313
4,219,360  8/1980  Thompson ........................ 501/144

Primary Examiner—Mark Bell
Attorney, Agent, or Firm—James R. Thornton

[57] ABSTRACT

Clayware is produced by firing a composition containing clay and a boron-containing flux, wherein the flux is a synthetic alkali metal and/or alkaline earth metal aluminosilicate having the crystal structure of a zeolite and containing boron entrapped within that structure. The boronated zeolite flux can be prepared in a form in which it can be used directly in the manufacture of clayware, especially earthenware.

11 Claims, No Drawings

COMPOSITIONS AND METHODS FOR PRODUCING CLAYWARE

This invention relates to a method for making clayware and in particular to the use of a novel flux for making clayware.

BACKGROUND OF THE INVENTION

Clayware such as porcelain, bone china, earthenware, the so-called ironstones, aluminous ceramics, hotel wares and ceramic tiles, is produced by firing a composition containing clay and flux.

Fluxes conventionally used in making clayware, such as exemplified above, are feldspars, nepheline syenite and Cornish stone. U.S. Pat. No. 3,704,146 describes fluxes for "white-ware" ceramic compositions comprising clay, flint and a flux, the fluxes being ground vitreous frits which may contain up to about 45% by weight of boric oxide. U.S. Pat. No. 4,219,360 describes use of $B_2O_3$ containing frits in manufacturing bone china. However, a frit is expensive to produce because of the energy consumption, the need for refractory furnace linings and because of the need to grind the product. Furthermore, the frits have been found not to be suitable for some clayware compositions due to slight leaching of boric oxide from the frit during manufacture of ceramic articles, for example, in preparing casting slips. U.S. Pat. Nos. 3,303,036 and 3,532,522 also describe use of inorganic borates in manufacturing ceramic ware.

Zeolites have been proposed as components of ceramic compositions especially in the production of lightweight ceramics. See, for example, Japanese Patent Nos. 69 23,815-7 and Japanese Patent Application No. 73 39,513. However, none of the zeolites are known to contain boron and the zeolites are used to confer refractory properties on the ceramics and are not used as fluxes.

DESCRIPTION OF THE INVENTION

The present invention provides a method of making a clayware by firing a composition containing clay and a boron-containing flux, wherein the flux is a synthetic alkali metal and/or alkaline earth metal aluminosilicate having the crystal structure of a zeolite and containing boron entrapped within that structure. For convenience, the flux to be used in accordance with the invention will be referred to as a "boronated zeolite".

The boron component of the boronated zeolite is less soluble than that of the ground vitreous frits. Thus, when entrapped in a zeolite structure, boron in its oxide form may be incorporated into clayware compositions in a water insoluble form and can contribute its valuable fluxing properties without detriment to the clayware products or to their methods of manufacture. It may have been predicted that the sodium oxide content of a sodium aluminosilicate zeolite, such as sodalite hydrate, would contribute to the fluxing properties of the material but it has been found that this effect is not significant. However, it has clearly been demonstrated that when boron is incorporated in the structure, the resultant material becomes an unexpectedly powerful flux. This is possibly because temperatures attained in clayware manufacture are not sufficiently high to melt a zeolite and activate its sodium oxide content as a flux; but when boric oxide is also present that melting point is decreased allowing sodium oxide and boric oxide to flux with synergistic effect.

Although the material used as flux according to the present invention is termed "boronated zeolite" it should be appreciated that the presence of boron in the boronated zeolite so reduces the water absorption capacity of the material that it could be considered feldspathoidal rather than zeolitic.

A boron-containing zeolite has previously been disclosed (J. Chem. Soc. (A) 1970, pp. 1516–23) and the use of boron to accelerate zeolite formation without leaving boron in the zeolite structure has also been disclosed (German OS 24 50 708). The present invention resides in the use of the boronated zeolite as one component, a flux, of a composition for making clayware.

A preferred example of clayware in which the boronated zeolite can be used as flux in earthenware when a composition containing ball clay, china clay, flint and the boronated zeolite is fired. Other types of clayware in which the boronated zeolite is valuable as a flux are porcelain, bone china, ironstones and hotel wares as well as ceramic tiles. Thus, for example, bone china can be prepared by firing, usually at a temperature below about 1200° C., preferably about 1180° C., a composition comprising calcined bone, china clay and the boronated zeolite.

The boronated zeolite can be synthesised in the form of fine crystals, for example having a particle size below 5 microns, which are of a size very suitable for use in the production of clayware. There is thus no need to resort to grinding as with the vitreous frits previously used as boron-containing fluxes. In addition, it has been found that bone china made according to this invention with a boronated zeolite flux has a translucency at least equal to that of bone china made with a conventional flux and that this translucency can be achieved at a lower firing temperature and in a shorter firing time.

The boronated zeolite flux used according to the present invention can be made by any of the conventional processes for hydrothermal crystallisation of zeolites, for example sodalite hydrate, from a source of silica, a source of alumina and a source of alkali metal or alkaline earth metal (such as sodium, calcium, potassium, magnesium, lithium, but preferably a source of sodium), but with a source of boron such as boric acid or a sodium borate in the synthesis mixture. The resultant zeolite has a $B_2O_3$ content of about 2 to 10 percent by weight, preferably about 3 to 7.5 percent $B_2O_3$.

Two examples of the production of a boronated zeolite are as follows:

EXAMPLE 1

1712 g. sodium hydroxide and 751 g. borax decahydrate were dissolved in 4000 g. distilled water in a stainless steel beaker. 1085 g. china clay having a particle size below 1 micron were added and the mixture was stirred for 24 hours at 85° C. (From observation, it appeared that 24 hours for crystallisation was more than needed; crystallisation appeared to be complete after about 6 hours). After filtering, washing well with distilled water, and drying overnight at 130° C., 1175 g. of product were obtained. Its X-ray diffraction powder pattern was substantially identical to that of the mineral nosean confirming the skeletal structure of the cage around the boron atom. Chemical analysis showed that the product contained 20.5% $Na_2O$, 5.0% $B_2O_3$, 31.4% $Al_2O_3$ and 39.8% $SiO_2$, the balance being water (all percentages being by weight). The particle size was mostly less than 5 microns. 10 g. of product were stirred with 100 g. distilled water for 6 hours at 25° C. but no more than one fiftieth of the $B_2O_3$ was leached out.

EXAMPLE 2

A boronated zeolite having the same properties as that produced by the method of Example 1 was made using sodium aluminate and sodium silicate as the source of alumina and silica, instead of china clay.

The following Examples illustrate the present invention.

EXAMPLE 3

The boronated zeolite made by Example 1 was mixed with china clay and calcined bone to form a body mix for making bone china of the following composition:

| | |
|---|---|
| Calcined bone | 55 parts by weight |
| China clay | 25 parts by weight |
| Boronated zeolite | 20 parts by weight |

This mix was made into a casting slip with 50 parts of water using Dispex N40 (a polyacrylate) as deflocculant. Discs 4.4 cm. in diameter×0.3 cm. were cast and, after drying, were fired using a heating rate of 150° C./hour to a final temperature of 1180° C. After holding at this temperature for 2 hours, the discs were allowed to cool slowly. The apparent porosity was found to be 2.1% and the translucency was found to be 40% more than that of a standard bone china fired at 1250° C. Translucency is expressed as the amount of light transmitted compared with standard bone china fired at 1250° C.

EXAMPLE 4

To illustrate the advantages of the boronated zeolites as fluxes for clayware, comparative trials were carried out between body mixes containing the boronated zeolite of Example 1 and body mixes containing respectively as fluxes sodalite and "Zeolite A".

The procedure was as follows:

Body mixes were prepared to the following composition:

| | |
|---|---|
| Calcined bone | 55 parts by weight |
| China clay | 25 parts by weight |
| Flux | 20 parts by weight |

200 g. of the body mix were blunged with 100 ml. of water to form a slip. Dispex N40 was used as deflocculant.

Discs 4.4 cm. diameter×0.3 cm. were cast, dried and fired to various temperatures at a heating rate of 150° C./hr. The discs were held for 2 hours at each temperature and then allowed to cool. After cooling, translucency and apparent porosity measurements were carried out.

The results were as shown in Table 1.

TABLE 1

| Firing temp. (°C.) | Apparent porosity %* | | | Translucency %* | | |
|---|---|---|---|---|---|---|
| | Boronated zeolite | Zeolite A | Sodalite | Boronated zeolite | Zeolite A | Sodalite |
| 1180 | 2.1 | 32.3 | 37.0 | 140 | 22 | 14 |
| 1220 | 18.9 | 32.6 | 33.4 | 130 | 43 | 13 |

TABLE 1-continued

| Firing temp. (°C.) | Apparent porosity %* | | | Translucency %* | | |
|---|---|---|---|---|---|---|
| | Boronated zeolite | Zeolite A | Sodalite | Boronated zeolite | Zeolite A | Sodalite |
| 1255 | 18.4 | 27.6 | 24.6 | 150 | 61 | 35 |

*For standard bone china apparent porosity = 2.0 and translucency = 100

These results indicate that neither "Zeolite A" nor sodalite is a suitable flux material.

The boronated zeolite shows good fluxing properties at the firing temperature of 1180° C. Discs fired at the higher temperatures of 1220° and 1255° C. were found to be badly bloated and distorted indicating overfiring.

Discs containing "Zeolite A" or sodalite were not adequately fired even at 1255° C. as indicated by high apparent porosity and low translucency.

EXAMPLES 5-7

Trials were carried out comparing earthenware body mixes containing a boronated zeolite with a standard earthenware body mix.

Body mixes were prepared to the following compositions in which parts are by weight:

| | A* | B | C | D* | E* |
|---|---|---|---|---|---|
| Ball clay | 25 | 25 | 25 | 25 | 25 |
| China clay | 25 | 25 | 25 | 25 | 25 |
| Flint | 35 | 35 | 35 | 35 | 35 |
| Cornish stone | 15 | — | — | — | — |
| Zeolite | — | 3 | 5 | 5 | 5 |

These mixes were made up as casting slips as follows:

| | A* | B | C | D* | E* |
|---|---|---|---|---|---|
| Ball clay | 50 | 50 | 50 | 50 | 50 |
| China clay | 50 | 50 | 50 | 50 | 50 |
| Flint | 70 | 70 | 70 | 70 | 70 |
| Cornish stone | 30 | — | — | — | — |
| Zeolite | — | 6 | 10 | 10 | 10 |
| Water | 95 | 90 | 80 | 80 | 80 |
| Dispex N40 | 0.8 | 0.8 | 0.8 | 0.8 | 0.8 |

*Comparative

Discs 4.4 cm. diameter×0.3 cm. were cast from each slip, dried and fired according to the following Examples. (Zeolite in B and C=boronated zeolite: in D=sodalite hydrate: in E=Zeolite A)

EXAMPLE 5

Discs were fired at different temperatures as shown in Table 2 in a gradient kiln at a heating rate of 300° C. per hour and then allowed to cool. Apparent porosity and bulk density measurements were carried out after cooling. The results obtained are shown in Table 2.

TABLE 2

| (a) Temp (°C.) | Apparent Porosity % | | | | |
|---|---|---|---|---|---|
| | A* | B | C | D* | E* |
| 1205 | 12.0 | 10.0 | 2.5 | 9.2 | 13.6 |
| 1155 | 18.9 | 15.3 | 12.4 | 15.6 | 20.1 |
| 1095 | 26.8 | 22.9 | 19.0 | 22.7 | 26.7 |

| (b) Temp (°C.) | Bulk density g/cm³ | | | | |
|---|---|---|---|---|---|
| | A* | B | C | D* | E* |
| 1205 | 2.20 | 2.22 | 2.29 | 2.24 | 2.16 |
| 1155 | 2.07 | 2.14 | 2.19 | 2.14 | 2.05 |

TABLE 2-continued

| 1095 | 1.88 | 1.99 | 2.06 | 1.99 | 1.89 |

*Comparative

EXAMPLE 6

Example 5 was repeated but the discs were given a one hour soak at the highest temperature. As before, apparent porosity and bulk density measurements were carried out after cooling. The results obtained are shown in Table 3.

TABLE 3

| Temp (°C.) | Apparent porosity % | | | Bulk density g/cm$^3$ | | |
|---|---|---|---|---|---|---|
| | A* | B | C | A* | B | C |
| 1265 | 6.6 | 4.5 | 0.05 | 2.27 | 2.27 | 2.32 |
| 1240 | 9.0 | 7.6 | 0.06 | 2.24 | 2.26 | 2.31 |
| 1195 | 13.4 | 11.6 | 6.1 | 2.18 | 2.21 | 2.28 |

EXAMPLE 7

Discs were fired at different temperatures in a gradient kiln at a heating rate of 50° C. per hour with a two hour soak at the highest temperature. Apparent porosity and bulk density measurements were carried out. The results are shown in Table 4.

TABLE 4

| Temp (°C.) | Apparent porosity % | | | Bulk density g/cm$^3$ | | |
|---|---|---|---|---|---|---|
| | A* | B | C | A* | B | C |
| 1155 | 17.7 | 17.3 | 11.5 | 2.09 | 2.11 | 2.20 |
| 1140 | 18.7 | 18.0 | 12.6 | 2.07 | 2.09 | 2.18 |
| 1105 | 23.7 | 21.3 | 17.3 | 1.97 | 2.03 | 2.10 |
| 1080 | 27.8 | 24.7 | 20.8 | 1.87 | 1.95 | 2.03 |

*Comparative

The results obtained in Tables 2 to 4 clearly demonstrate improvements achieved using a boronated zeolite as a flux in fired earthenware products compared with the known flux Cornish stone.

Various changes and modifications of the invention can be made and, to the extent that such variations incorporate the spirit of this invention, they are intended to be included within the scope of the appended claims.

What is claimed is:

1. A method of producing clayware by firing a composition containing clay and a boron-containing flux, characterised in that the flux is a synthetic alkali metal and/or alkaline earth metal aluminosilicate having the crystal structure of a zeolite and containing boron entrapped within that structure.

2. A method according to claim 1, characterised in that the aluminosilicate has been synthesised by hydrothermal crystallisation from a reaction mixture containing a source of alkali metal or alkaline earth metal, a source of silica, a source of alumina and a source of boron.

3. A method according to claim 2, characterised in that the aluminosilicate is in the form of crystals having a particle size below 5 microns.

4. A method according to claim 1, characterised in that the aluminosilicate is a sodium aluminosilicate.

5. A method according to claim 1, characterised in that a composition comprising calcined bone, china clay and the boron-containing flux is fired to produce bone china.

6. A method according to claim 5, characterised in that the composition is fired at a temperature below about 1200° C.

7. A method according to claim 1, characterised in that a composition containing ball clay, china clay, flint and the boron-containing flux, is fired to produce earthenware.

8. The method according to claim 1 in which said boron-containing aluminosilicate contains about 3 to 7.5 percent, by weight, $B_2O_3$.

9. The method according to claim 1 in which said boron-containing aluminosilicate contains about 2 to 10 percent by weight, $B_2O_3$.

10. The method according to claim 5 in which said boron-containing flux contains about 3 to 7.5 percent, by weight, $B_2O_3$.

11. The method according to claim 7 in which said boron-containing flux contains about 3 to 7.5 percent, by weight, $B_2O_3$.

* * * * *

UNITED STATES PATENT OFFICE
CERTIFICATE OF CORRECTION

Patent No. 4,337,317      Dated June 29, 1982

Inventor(s) IAN A. BEARD

It is certified that error appears in the above-identified patent and that said Letters Patent are hereby corrected as shown below:

Column 1, line 53, the word "zeolite" should read -- zeolitic -- .

Column 2, line 18, the word "in" should read -- is -- .

Signed and Sealed this

Thirty-first Day of August 1982

[SEAL]

Attest:

Attesting Officer

GERALD J. MOSSINGHOFF
Commissioner of Patents and Trademarks